US006681278B1

(12) United States Patent
Jakl

(10) Patent No.: US 6,681,278 B1
(45) Date of Patent: Jan. 20, 2004

(54) COMMUNICATION PROTOCOL FOR ENERGY SYSTEM INTEGRATED ON A SYSTEM COMMUNICATION BUS

(75) Inventor: Daniel J. Jakl, Lawrenceville, GA (US)

(73) Assignee: Motorola, Schaumburg, IL (US)

( * ) Notice: Subject to any disclaimer, the term of this patent is extended or adjusted under 35 U.S.C. 154(b) by 465 days.

(21) Appl. No.: 09/699,206

(22) Filed: Oct. 29, 2000

Related U.S. Application Data
(60) Provisional application No. 60/172,384, filed on Dec. 17, 1999.

(51) Int. Cl.$^7$ ............................................. G06F 13/00
(52) U.S. Cl. ........................................ 710/100; 710/240
(58) Field of Search ................................. 713/305, 323, 713/324, 330, 340; 710/32, 100, 240; 320/106, 110.137, 162, 150, 149

(56) References Cited

U.S. PATENT DOCUMENTS 5,534,765 A * 7/1996 Kreisinger et al. ......... 320/106
5,572,110 A * 11/1996 Dunstan ..................... 320/106
6,005,367 A * 12/1999 Rohde ........................ 320/106
6,173,350 B1 * 1/2001 Hudson et al. ............. 710/100
6,522,104 B1 * 2/2003 Drori ......................... 320/149

* cited by examiner

*Primary Examiner*—Khanh Dang
(74) *Attorney, Agent, or Firm*—Philip H. Burrus, IV

(57) ABSTRACT

A computer system having an integrated energy system on a system communication bus where the energy system includes a plurality of energy devices. Each energy device is integrated on the system communication bus and has a memory and processor. Each energy device processor selectively monitors the system communication bus for communication data idleness and upon the communication data being idle, each energy device attempts to communicate with other energy devices of the energy system. The energy devices attempt to communicate in a predetermined sequence after communication data idleness has been detected. Examples of energy devices are battery packs, desktop chargers, analyzers, and radios.

6 Claims, 2 Drawing Sheets

COMMUNICATION PROTOCOL FOR ENERGY SYSTEM INTEGRATED ON A SYSTEM COMMUNICATION BUS

CROSS-REFERENCE TO RELATED APPLICATIONS

This application claims priority from U.S. Provisional Application Ser. No. 60/172,384, filed Dec. 17, 1999, the disclosures of which, including all attached documents and appendices, are incorporated by reference in their entirety for all purposes.

TECHNICAL FIELD

The present invention generally relates to computer systems including resident energy systems. More particularly, the present invention relates to an energy supply system integrated on a system communication bus where the energy system communicates with other energy devices on the bus with a specific communication protocol.

BACKGROUND

The energy systems for portable electronic devices, such as cellular telephones, are becoming quite electronically sophisticated. Existing energy devices, such as rechargeable batteries, often have electronic memory and processing capabilities. An example of a rechargeable battery with memory is illustrated in U.S. Pat. No. 5,534,765, which issued on Jul. 9, 1996, to Kreisinger, et al., and is titled "Battery with Memory for Storing Charge Procedure." Kreisinger discloses a battery charger system that includes a charger for supplying charge current and voltage and a rechargeable battery with a memory for storing specific charge parameters. The charge parameters typically are battery-related information governing the charging of the battery. The battery-related information stored in the memory of the battery can also include charge instructions for the charger or a specific procedure for charging the battery. Consequently, the battery must have access to the system communication bus in order to communicate the charge instructions or procedure to the charger.

Thus, in the prior art energy systems for portable electronic devices, only two energy system devices would need to share the system communication bus of the electronic device. However, a modern energy system can include five or more energy devices all interconnected to and communicating across the system communication bus. The increased complexity of communications between the various energy devices can disrupt other data flowing across the bus, such as the communication data of a cellular telephone, and seriously interfere with the functionality of the electronic device.

Accordingly, with the use of several energy devices that are integrated on the system communication bus, it is necessary to provide an adequate communication protocol such that the other energy devices can communicate without interfering with the functions of the other electronic devices, such as gauging, charging, communication, and the like. It is therefore to such an improved energy system having a satisfactory communication protocol between energy devices resident on the system communication bus that the present invention is primarily directed.

DETAILED DESCRIPTION OF THE INVENTION

Figure 1:
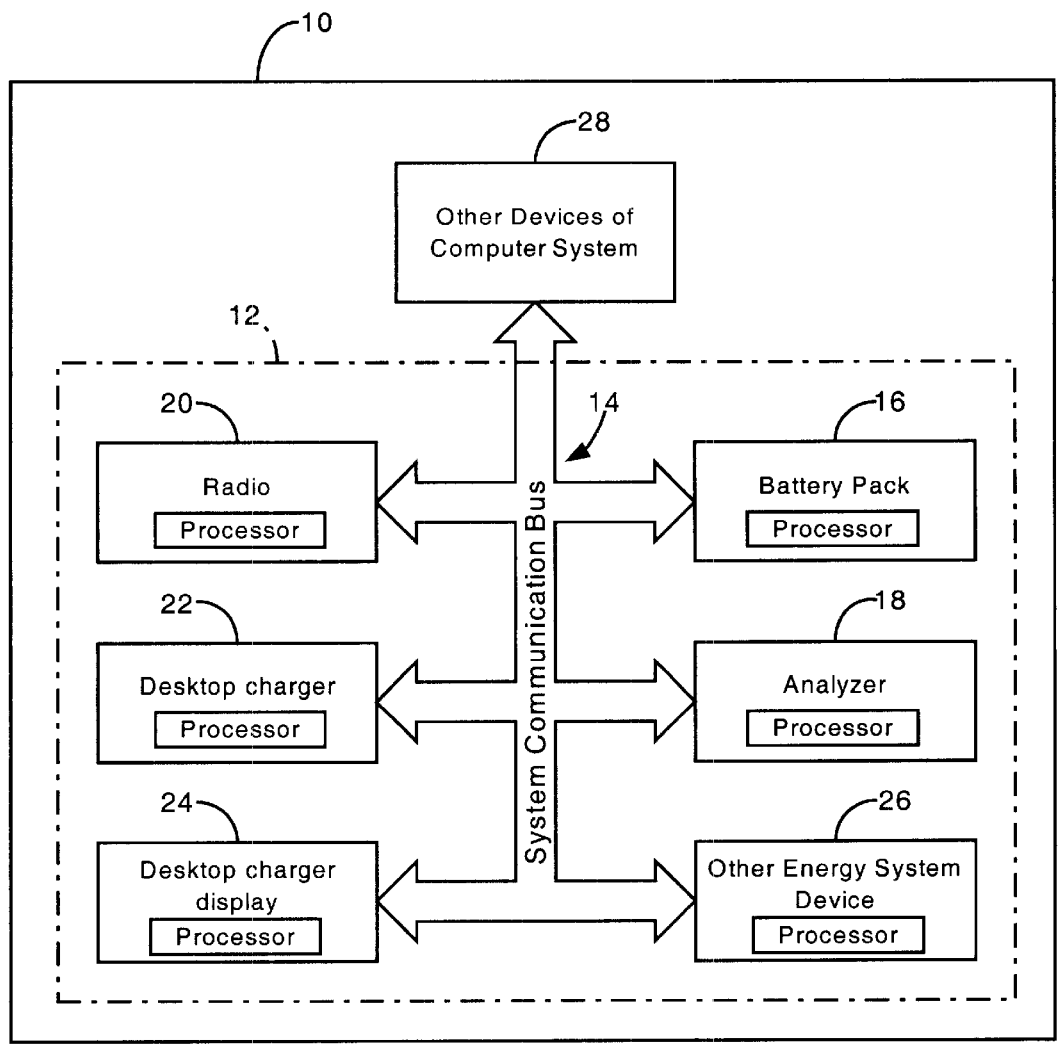
FIG. 1 is a block diagram of the computer system with an integrated energy system having a plurality of energy devices within the energy system.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

FIG. 1 illustrates a computer system 10 having an integrated energy system 12 on a system communication bus 14. The computer system 10 is present in a portable electronic device, such as a cellular telephone, that has need for an active energy management system, such as battery recharging. While the computer system 10 is shown here as including the energy system 12, a device can be alternately embodied with a separate computer system 10 and energy system 12, or only with an energy system 12. The energy system 12 includes a plurality of energy devices, such as the battery pack 16, analyzer 18, radio 20, desktop charger 22, desktop charger display 24, or other energy system device 20, and each of which is integrated on the system communication bus 14 and can communicate across the bus 14. The system communication bus 14 allows multipoint communication between the energy devices in either a half-duplex or full-duplex mode whereby each device can engage in a communication dialog with the other across the communication bus 14.

The energy devices each include an energy device processor such that each energy device processor can selectively monitor the system communication bus 14 for communication data idleness, i.e. that other devices of the computer, as shown at block 28, are not using the system communication bus 14 for data transmission. The energy devices also preferably include a memory that can store data for the energy device, and the data is communicated to other devices when the communication bus 14 is available. The energy device processor can be any processor, microcontroller, and microprocessor that is known in the art. Upon the communication data being idle on the system communication bus 14, each energy device 16,18,20,22,24, 26 attempts to communicate with other energy devices 16,18,20,22,24,26 of the energy system 12 on the system communication bus 10 in a preferred sequence as discussed herein. The energy devices preferably then poll the other devices on the system communication bus 14 to determine if any energy system device data is present for transfer.

The processors of the energy devices 16,18,20,22,24,26 monitor the communication bus is a predetermined sequence such that the monitoring of the devices do not coincide to cause the devices to mistakenly detect communication on the system communication bus 12. Further, the energy devices attempt to communicate on the idle system communication bus 14 in a protocol having a predetermined sequence such that the energy devices do not attempt to communicate over each other on the bus 14 to cause a data collision or other bus interrupt. Because of a sequential protocol, the energy devices of the energy system 12 can share a one-wire system communication bus 14, such as a One-Wire Dallas bus, with multiple devices. However, some battery packs (such as battery pack 16) may contain up to two Dallas Semiconductor One-Wire for the energy system 12 and each interface device may be connected to the system communication bus 14. Furthermore, the desktop charger 22 is preferably capable of reading DS2502 EPROMs, DS2438 Smart Battery Monitors, DS2423 NVSRAMs, and coding resistors.

Figure 2:
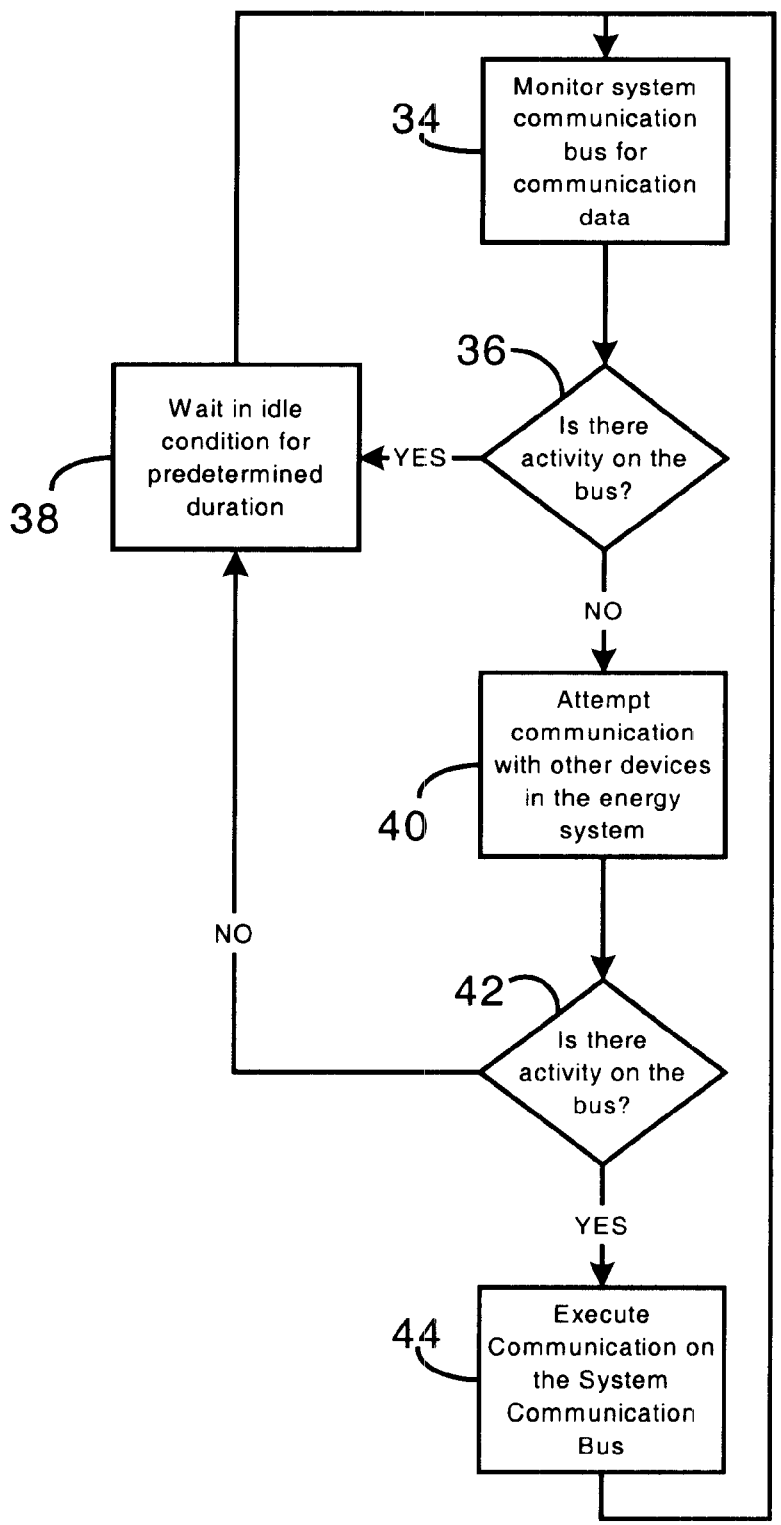
FIG. 2 is a flowchart illustrating the preferred protocol that each energy device uses to monitor the system communication bus and selectively communicate with the other energy devices.

With reference to FIG. 2, there is shown the preferred protocol for the sequential monitoring and sequential communication of the energy devices. Each of the energy devices 16,18,20,22,24,26 monitors the system communication bus 14, as shown at step 34, for communication data flow across the system communication bus 14. It should be noted that the energy devices can detect communication data with a positive or negative-edge trigger. A decision is then made as to whether there is activity, i.e. communication data for a cellular telephone, on the bus 14, as shown at decision 36. If there is communication data flowing, then the device waits in an idle condition for a predetermined duration, as shown at step 38, and then once again monitors the system communication bus 14 for communication data, i.e. returns to step 34. However, the monitoring state of step 34 and idle state of step 38 can be the same step if the device is constantly monitoring the communication bus 14, i.e. is either in constant monitoring or cyclically monitoring the communication bus 14 over a very short duration such as a few microseconds. Otherwise, a wait state will be entered while the monitoring step cycles.

An exemplary predetermined duration of idleness before re-monitoring the system communication bus 14 as follows:

| | |
|---|---|
| Radio 20: | 10 msec +/− 499 usec |
| Desktop Charger 22: | 11 msec +/− 499 usec |
| Desktop Charger Display 24: | 12 msec +/− 499 usec |
| Analyzer 18: | 13 msec +/− 499 usec |
| Other Energy System Device 26: | 14 msec +/− 499 usec |

The importance of the above progressive sequence is that the monitoring the communication bus 14 is done sequentially so that the devices do not detect the monitoring activities of the other devices and mistake the monitoring for communication activity on the line. Thus, as long as the monitoring of the energy devices of the communication bus 14 is done sequentially, the actual duration of delay between the devices monitoring the communication bus 14 need only be greater than a sufficient duration to not interfere with the monitoring of another device. It scan thus be seen that other energy devices, such as battery pack 16, can easily be added to the sequential protocol with the idle period for monitoring being 1 millisecond earlier or later than the shortest or longest idle time existing devices in the energy system 12.

Referring again to decision 36, if the system communication bus 14 is idle, the energy devices attempt communication with the other devices on the energy system 12 in a predetermined sequence, as shown in step 40. The preferred transmission protocol begins with a pulse to effect reset of all external data devices of the energy system 12.

An example of the timing sequence for each energy device to generate a reset pulse on the communication bus 14 is as follows:

| | |
|---|---|
| Radio 20: | 574 msec +/− 10 usec |
| Desktop Charger 22: | 553 msec +/− 10 usec |
| Desktop Charger Display 24: | 532 msec +/− 10 usec |
| Analyzer 18: | 511 msec +/− 10 usec |
| Other Energy System Device: | 490 msec +/− 10 usec |

As with the sequential monitoring of the communication bus 14, the sequencing of the reset pulses is required so that the devices do not attempt to communicate over the communication bus 14 at the same time and cause a data collision. Consequently, the above sequence is simply illustrative of a sequence to avoid the data collision and other durations between reset pulses or communication can be alternately used.

One example of communication bus 14 control is, upon a battery pack is placed within a desktop charger 22, the charger 22 changes the bus 14 to a specific state, such as a high idle state. If the communication bus 14 is idling in a high state, the detection of an idle low state indicates that no charger 22 is present or no communication is occurring and a system device, other than the charger, may seize the bus 14 when it needs to communicate. However, such pull-up must be disabled upon completion of the communication by the energy device across the bus 14. Other methods of communication bus 14 control as are known in the art can be alternately used in the present invention.

Following the reset pulse, the energy device shall determine if the system communication bus 14 has activity, as shown at decision 42, i.e. monitor the system communication bus 14 to determine if data is flowing across the system communication bus 14. If there is communication across the system communication bus 14, then the energy device must assume there is communication data on the system communication bus 14 data line and once again wait in an idle condition for a predetermined duration (step 38) and/or monitor the bus 14 for communication data, step 34, after the predetermined duration of idleness. If there is no communication data on the system communication bus 14 after the reset pulse, the energy system device can then send data across the system communication bus 14, as shown at step 44. In essence, the energy system device can seize the system communication bus 14 without a high likelihood of data collision because of the inventive sequential monitoring and transmission protocol of the energy devices 16,18,20, 22,24 in communicating across the system communication bus 14. Once the communication data is sent across the system communication bus 14 by the energy system device, the device returns to monitor the system communication bus 14 for communication data or for data from another energy system device, i.e. returns to step 34.

It is also preferred that the desktop charger 22, upon polling the system communication bus 14 at decisions 42 and detecting communication data, will cease any charge or discharge current flowing to or from the battery pack 16. Such action minimizes undesirable electromagnetic interference (EMF) by flowing charge current upon the other components of the computer system 10. However, in systems where EMF and other interference by the charge current is trivial, the desktop charger 22 does not have to disable charge current upon the detection of communication data on the communication bus 14.

While there has been shown a preferred embodiment of the present invention, it is to be understood that certain changes may be made in the forms and arrangement of the elements without departing from the underlying spirit and scope of the invention as is set forth in the claims.

What is claimed is:

1. A computer system having an integrated energy system on a system communication bus, comprising:

an energy system integrated on the system communication bus, the energy system including a plurality of energy devices, each energy device integrated on the system communication bus and including a memory and an energy device processor;

wherein each energy device processor has a progressive, sequential predetermined duration of idleness associated therewith, wherein each energy device processor selectively monitors the system communication bus for communication data idleness sequentially per the progressive, sequential predetermined duration of idleness so that the devices do not mistake the monitoring activities of the other devices for communication activity and upon the communication data being idle, each energy device attempts to communicate with other energy devices of the energy system on the system communication bus.

2. The system of claim 1, wherein each of the energy device processors selectively monitors the system communication bus for communication data idleness in a predetermined sequence.

3. The system of claim 2, wherein each of the energy device processors attempts to communicate on the idle system communication bus in a predetermined sequence.

4. The system of claim 1, wherein at least one of the plurality of energy devices is a desktop charger.

5. The system of claim 4, wherein the desktop charger disables charging and discharging current if communication data is present on the system communication bus.

6. The system of claim 1, wherein each energy device processor has a sequential reset pulse associated therewith, and prior to transmission of data, each energy device processor actuates the system communication bus sequentially so that the devices do not attempt to communicate over the communication bus at the same time and cause a data collision.

* * * * *